United States Patent [19]
Ikeda et al.

[11] Patent Number: 5,959,957
[45] Date of Patent: Sep. 28, 1999

[54] PROBE AND A CANTILEVER FORMED WITH SAME MATERIAL

[75] Inventors: Tsutomu Ikeda, Hachioji; Takayuki Yagi, Yokohama; Yasuhiro Shimada, Hadano, all of Japan

[73] Assignee: Canon Kabushiki Kaisha, Tokyo, Japan

[21] Appl. No.: 08/786,181

[22] Filed: Jan. 21, 1997

[30] Foreign Application Priority Data

Jan. 19, 1996 [JP] Japan ................................. 8-025902

[51] Int. Cl.⁶ .............................. G11B 9/00; G02B 21/00
[52] U.S. Cl. ......................... 369/127; 369/126; 250/306
[58] Field of Search .................................. 369/126, 127; 73/105; 250/306, 307

[56] References Cited

U.S. PATENT DOCUMENTS

| | | | |
|---|---|---|---|
| 3,664,874 | 5/1972 | Epstein | 136/89 |
| 4,614,119 | 9/1986 | Zavracky et al. | 73/704 |
| 5,221,415 | 6/1993 | Albrecht et al. | 156/629 |
| 5,248,079 | 9/1993 | Li | 228/121 |
| 5,321,685 | 6/1994 | Nose et al. | 369/126 |
| 5,357,108 | 10/1994 | Suzuki et al. | 369/126 |
| 5,357,787 | 10/1994 | Kado et al. | 73/105 |
| 5,506,829 | 4/1996 | Yagi et al. | 369/126 |
| 5,546,375 | 8/1996 | Shimada et al. | 369/126 |
| 5,631,463 | 5/1997 | Kawasaki et al. | 250/306 |
| 5,717,132 | 2/1998 | Watanabe et al. | 73/105 |

FOREIGN PATENT DOCUMENTS

| | | |
|---|---|---|
| 0535934A1 | 7/1993 | European Pat. Off. . |
| 04321955 | 11/1992 | Japan . |
| 9015986 | 12/1990 | WIPO . |

OTHER PUBLICATIONS

C. Spindt et al. "Physical properties of thin–film field emission cathodes with molybdenum cones," J. Appl. Phys; vol. 47, Dec. 1976, pp. 5248–5263.

O. Wolter et al., "Micromachined Silicon Sensors for Scanning Force Microscopy", *J. Vac. Sci. Tech. B* 9(2), Mar./Apr. 1991, pp. 1353–57.

Patent Abstracts of Japan, vol. 018, No. 332 (E–1567), Jun. 23, 1994 & JP 06 084455 A (Canon Inc), Mar. 25, 1995.

*Primary Examiner*—John W. Cabeca
*Assistant Examiner*—Kim-Kwok Chu
*Attorney, Agent, or Firm*—Fitzpatrick, Cella, Harper & Scinto

[57] ABSTRACT

A probe has a metal tip on a cantilever. A diffused layer made from a metal silicide is formed at an interface between the tip and the cantilever. In the diffused layer, a material for forming the cantilever and a material for forming the tip are diffused.

9 Claims, 7 Drawing Sheets

PROBE AND A CANTILEVER FORMED WITH SAME MATERIAL

BACKGROUND OF THE INVENTION

1. Field of the Invention

The present invention relates to a probe used in a scanning probe microscope, a method of manufacturing the probe, a probe unit, and an information recording/reproducing apparatus using the probe unit.

2. Related Background Art

As a surface microscope having an atomic scale spatial resolution, a scanning tunnel microscope (to be abbreviated as an STM hereinafter) and a scanning atomic force microscope (to be abbreviated as an AFM hereinafter) are put into practical use (a scanning probe microscope (to be abbreviated as an SPM hereinafter) is a general term for these microscopes).

In these SPMs, a tip can access a sample surface on an atomic level. Therefore, it is being attempted to apply these SPMs to an information recording/reproducing apparatus which writes recording information in a local region. The STM detects a tunnel current flowing when the distance between a biased conductive tip and a conductive sample is decreased to a few Å or smaller, scans the tip while controlling the distance between the tip and the sample so that the tunnel current is held constant, and forms an image of the tunnel current or of a feedback control signal, thereby constructing the surface image. Examples of a recording method using the STM are a method in which a voltage is applied between a tip and a recording medium to locally change the surface state of the recording medium, and a method in which the conductivity of a recording medium is changed.

On the other hand, the AFM detects an atomic force acting between a tip and the surface of a sample when the tip is approached to a distance of several Å or less from the sample, and scans the tip in a two-dimensional plane, thereby constructing the surface image containing undulation information.

As a means for detecting the atomic force, an elastic cantilever which has one fixed end and holds the tip in the vicinity of the free end is used.

A scanning atomic force/tunnel composite microscope (AFM/STM) is an example of a multifunctional microscope for singly performing AFM and STM observations.

In this microscope, a probe used in the AFM consists of a cantilever and a tip held by the cantilever. The tip is made from a conductive material, and this allows the microscope to detect a current flowing between the tip and a sample.

In a common use method, the microscope can detect a current by applying a bias between the tip and a sample during an AFM operation and can simultaneously obtain a surface undulation image and a tunnel current distribution image by using the same tip.

Since the tip of this composite apparatus can also access the sample surface on an atomic level, it is being tried to apply the composite apparatus to an information recording/reproducing apparatus which writes recording information in a local region.

If this is the case, a plurality of probes are used in order to increase the write or read rate (Japanese Laid-Open Patent Application No. 04-321955).

A conventional probe formation method (U.S. Pat. No. 5,221,415) is shown in FIGS. 1A to 1G. First, crystallographic axis anisotropic etching is performed for a single-crystal Si substrate 202 on which an Si oxide film 201 is formed, thereby forming a recessed portion 203 with an inverse pyramid shape (FIG. 1A).

After the recessed portion 203 is formed, the Si oxide film 201 is removed.

By using this recessed portion 203 as a female mold, all surfaces are covered with a silicon nitride layer 204 (FIG. 1B). This silicon nitride layer 204 is patterned into the shape of a cantilever 205 (FIG. 1C). A glass plate 208 having a saw-cut groove 206 and a Cr layer 207 is joined to the silicon nitride layer 204 (FIG. 1D). A portion of the glass plate 208 is cut away (FIG. 1E). Thereafter, the single-crystal Si substrate 202 is etched away to form a cantilever probe 209 (FIG. 1F).

Finally, a metal layer 210 serving as an optical lever type AFM reflecting film is formed.

Examples of a tip formation method are shown in FIGS. 2A and 2B. In the method shown in FIG. 2A, a thin-film layer 211 is patterned into the shape of a circle on the substrate, silicon 212 is etched by using the circular layer 211, and a tip 213 is formed by using side etching (O. Wolter et al., "Micromachined silicon sensors for scanning forcemicroscopy", J. Vac. Sci. Technol. B9(2), Mar/Apr, 1991, pp. 1353–1357). In the method shown in FIG. 2B, a conductive material 215 is obliquely deposited in an inversely tapered resist hole 214 while the substrate is rotated, and a tip 213 is formed by lifting off the conductive material (C. A. Spindt et al., "Physical properties of thin film field emission cathode with molybdenum cones", J. Appl. Phys., 47, 1976, pp. 5248–5263).

Unfortunately, the methods shown in FIGS. 1A to 1G, 2A, and 2B have the following problems.

First, the problems of the lever of the probe will be described. Films of $SiO_2$, SiN, SiC, and Cr formed by vacuum deposition or CVD more or less have an internal stress although they are polycrystalline or amorphous. This undesirably warps the lever itself.

Also, when a portion of a thin-film lever made from $SiO_2$ or SiN is held on a thick substrate such as an Si substrate, a stress is produced in the stacked portion of these materials. This stress particularly concentrates in the base portion of the lever. Therefore, when repeatedly operated, the lever can break from this base portion.

Additionally, when a cantilever probe is coated with, e.g., a metal film in order to impart light reflecting properties or conducting properties to the probe, a stress occurs between the cantilever and the metal film and this warps the cantilever. If the cantilever warps toward a tip and the point of the cantilever warps to the opposite side, there is the possibility that a middle portion of the cantilever comes in contact with a sample or a recording medium. This is particularly a problem when a plurality of probes are used since warp variations take place. That is, in an information processing apparatus using the principle of AFM/STM, a plurality of probes in the same plane are to be simultaneously brought into contact with a recording medium. If these levers have warp variations, the levers apply different loads on the recording medium. Depending on the magnitudes of these loads, the resolution is decreased or the recording medium or the point of the tip is broken.

The tip itself has the following problem. When an STM probe is manufactured by coating a cantilever probe with a conductive material, the point of the tip is difficult to coat since the point is formed to be sharp. Consequently, it is difficult to obtain stable characteristics in the STM which handles a weak current called a tunnel current. For example, in the tips shown in FIGS. 2A and 2B, the resist patterning conditions and the etching conditions of the materials when the tips are formed are difficult to hold constant. This results in the problem that it is difficult to accurately maintain the heights of a plurality of tips formed and the shapes such as the radius of curvature of the point.

SUMMARY OF THE INVENTION

It is, therefore, an object of the present invention to solve the above conventional problems and provide a probe in which a cantilever itself has no warp and does not warp due to an electrode line, an electrode area can be decreased, a stray capacitance between the cantilever and a recording medium can be reduced, the recording speed can be increased, the cantilever is not broken by a stress, a conductive metal tip having a sharp point can be formed on the cantilever with a high reproducibility, the weight can be decreased, and the metal tip can be easily formed in a desired position, a method of manufacturing the probe, a probe unit, and an information recording/reproducing apparatus using the probe unit.

The above object of the present invention is achieved by a probe having a metal tip on a cantilever, comprising:
 a diffused layer which is formed at an interface between the tip and the cantilever and in which a material forming the cantilever and a material forming the tip are diffused.

The above object of the present invention is achieved by a method of manufacturing a probe having a metal tip on a cantilever, comprising the steps of:
 forming a cantilever on a first substrate;
 forming a tip on a second substrate; and
 joining the tip to the cantilever by forming a diffused layer, in which a material forming the cantilever and a material forming the tip are diffused, at an interface between the tip and the cantilever.

The above object of the present invention is achieved by a probe unit including a probe having a metal tip on a cantilever, comprising:
 a substrate on which a signal processing IC is formed;
 a cantilever supported by the substrate;
 a tip joined on the cantilever; and
 a diffused layer which is formed at an interface between the tip and the cantilever and in which a material forming the cantilever and a material forming the tip are diffused.

The above object of the present invention is achieved by an information recording/reproducing apparatus for performing recording and reproduction of information on a recording medium by using a probe having a metal tip on a cantilever, comprising:
 a probe unit comprising
  a substrate on which a signal processing IC is formed,
  a cantilever supported by the substrate,
  a tip joined on the cantilever, and
  a diffused layer which is formed at an interface between the tip and the cantilever and in which a material forming the cantilever and a material forming the tip are diffused; and
 means for applying a voltage between the tip and the recording medium.

The present invention will be described in detail with reference to preferred embodiments to be described later in conjunction with the accompanying drawings.

DETAILED DESCRIPTION OF THE PREFERRED EMBODIMENTS

The present invention will be described in detail below with reference to the accompanying drawings.

Figure 3A:
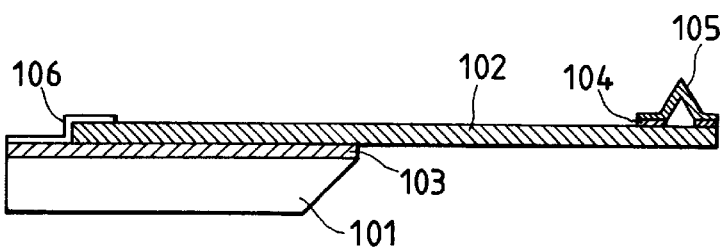
FIGS. 3A and 3B are views showing a probe of the present invention.
Figure 3B:
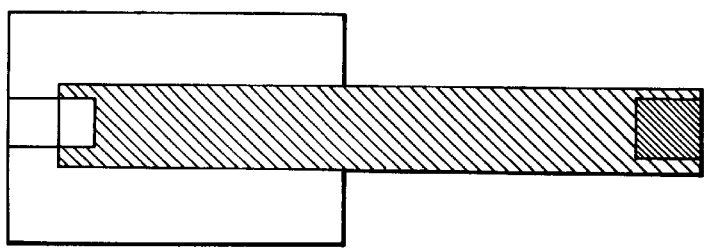

FIGS. 3A and 3B are sectional and plan views, respectively, of a probe of the present invention.

A single-crystal Si substrate 101 and a single-crystal Si cantilever 102 are arranged via an $SiO_2$ layer 103.

An impurity is doped in the single-crystal Si cantilever 102 to extract a tunnel current.

A metal tip 105 is formed on a free end portion of the cantilever 102. A metal silicide layer 104 made from the same materials as the cantilever 102 and the tip 105 is formed at the interface between the cantilever 102 and the tip 105. An electrode line 106 is formed on the other end of the cantilever 102.

Since the Si cantilever 102 is used as a tunnel current extracting line, no warp occurs in the cantilever due to the electrode line.

Additionally, a tunnel current is extracted from the Si cantilever 102 by using the electrode line 106. This decreases the electrode area when compared to a probe in which a cantilever and an entire surface of a substrate holding the cantilever are coated with a conductive material.

Accordingly, when information is to be recorded by applying a voltage to a recording medium, a stray capacitance produced between the probe and the recording medium can be reduced. Consequently, the voltage application time can be shortened.

That is, information can be recorded at a higher speed.

FIGS. 4A to 4F illustrate a method of manufacturing the probe of the present invention.

Figure 4A:
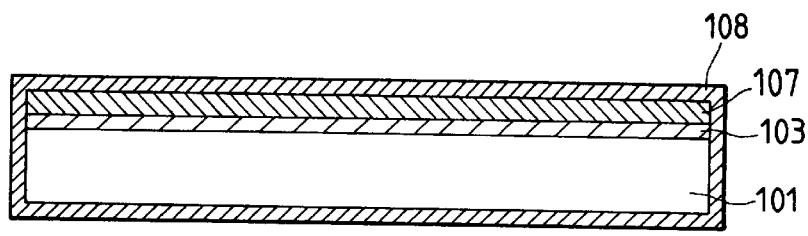
FIGS. 4A to 4F are sectional views showing the steps in manufacturing the probe of the present invention.

A substrate obtained by forming an $SiO_2$ layer 103 and a single-crystal Si layer 107 on a single-crystal Si substrate 101, i.e., an SOI (Silicon On Insulator) substrate, is coated with a silicon nitride (SiN) layer 108 (FIG. 4A).

This single-crystal Si layer 107 is doped with an impurity and having a low resistance. The resistivity is preferably 0.01 Ω·cm or less.

The thickness of the single-crystal Si layer 107 is determined together with the shape of a desired cantilever with respect to the spring constant of the cantilever. The thickness is usually 0.1 to several μm.

The $SiO_2$ layer 103 and the SiN layer 108 need only have thicknesses which can resist etching using an aqueous potassium hydroxide solution performed later. Usually, the thickness of the $SiO_2$ layer 103 is about 0.1 to 1.0 μm, and the thickness of the SiN layer 108 is 0.1 to 0.3 μm.

Subsequently, the SiN layer 108 in a lever formation portion on the back side of the substrate and the SiN layer 108 on the entire upper surface are removed by dry etching.

Figure 4B:
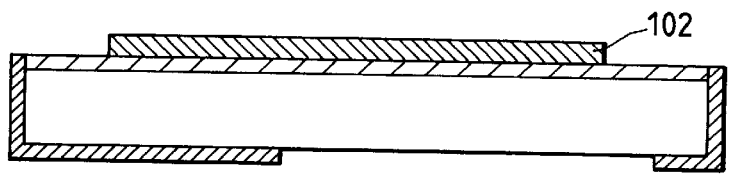

The single-crystal Si layer 107 is processed into the shape of a cantilever 102 (FIG. 4B).

Figure 4C:
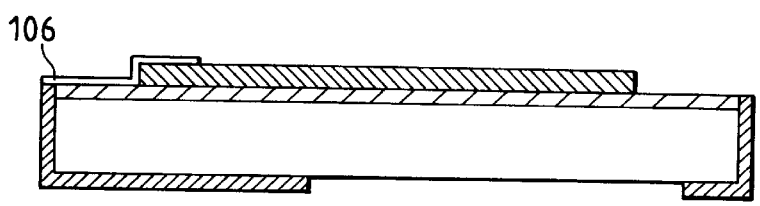

An electrode line 106 for extracting a tunnel current from the cantilever 102 is formed in one end of the cantilever 102 (FIG. 4C).

In the present invention, the cantilever 102 functions as a tunnel current extracting electrode and a mechanical elastic member.

Subsequently, a tip is formed on another substrate.

Figure 5A:
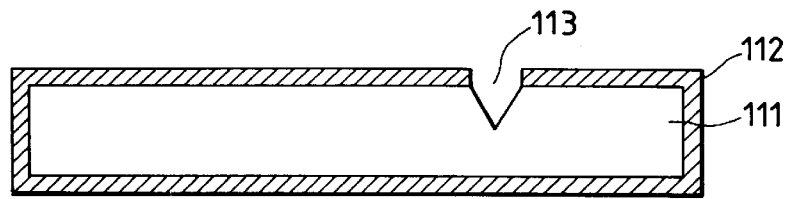
FIGS. 5A to 5E are sectional views showing the steps in manufacturing the probe of the present invention.

An $SiO_2$ layer or SiN layer 112 on a (100) Si substrate 111 is removed into the shape of a rectangle or a circle to expose the Si surface. Crystallographic axis anisotropic etching is performed for the exposed Si surface by using an aqueous potassium hydroxide solution, forming a recessed portion 113 (FIG. 5A).

Figure 5B:
Figure 5C:

After the $SiO_2$ layer or SiN layer is removed (FIG. 5B), the substrate is again covered with a thin $SiO_2$ layer 114 (FIG. 5C).

Figure 5D:
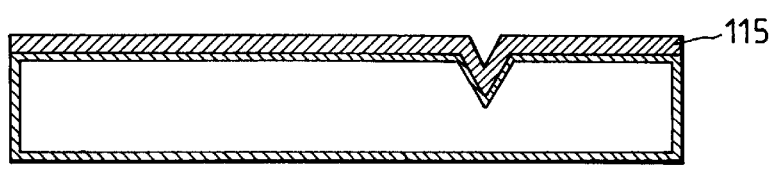
Figure 5E:

Subsequently, a tip material film 115 is formed on the substrate (FIG. 5D) and patterned to form a tip 105 (FIG. 5E).

The tip material is a metal capable of extracting a tunnel current. It is possible to preferably use Au or Pt which does not easily form an oxide film or Ir having a high mechanical strength.

The tip 105 is then transferred onto the cantilever 102.

Figure 6A:
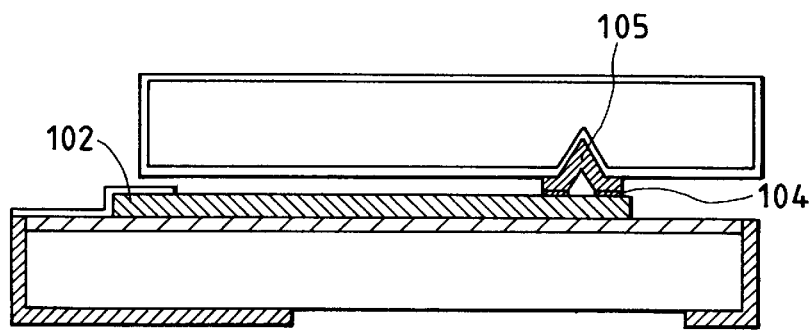
FIGS. 6A and 6B are sectional views showing the steps in manufacturing the probe of the present invention.
Figure 6B:
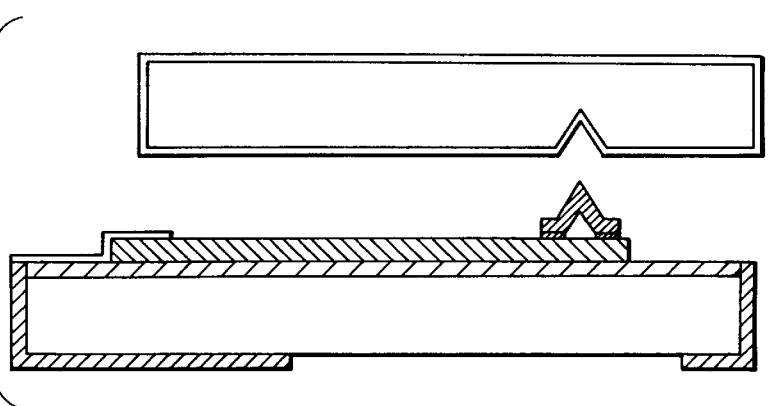

A method of transferring and joining the tip 105 is as follows (FIGS. 6A and 6B). First, a natural SiO film on the surface of the cantilever 102 is removed by a buffer hydrofluoric acid (BHF), and the two substrates are positioned.

Subsequently, the tip 105 and the cantilever 102 are brought into contact with each other, and the respective materials of these members are diffused to form a metal silicide layer 104 (FIG. 6A).

By the formation of this metal silicide layer, the tip and the cantilever are strongly joined and are not peeled from each other. Thereafter, the tip 105 is transferred onto the cantilever 102 by peeling the substrate (FIG. 6B).

A warp of the cantilever caused by a film stress can be avoided because the single-crystal cantilever is used and the tip is transferred only to the distal end of the cantilever.

Figure 4D:
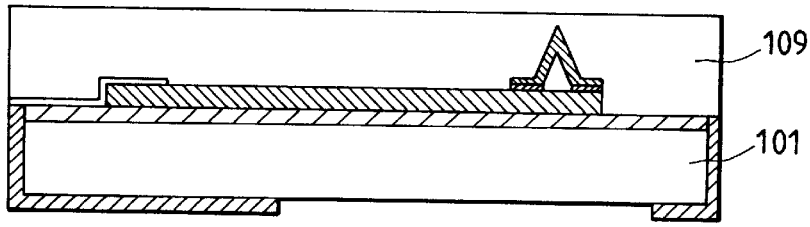

Subsequently, a protective layer 109 such as a resist or a polyimide resin is formed to protect the surface from contamination (FIG. 4D).

Figure 4E:
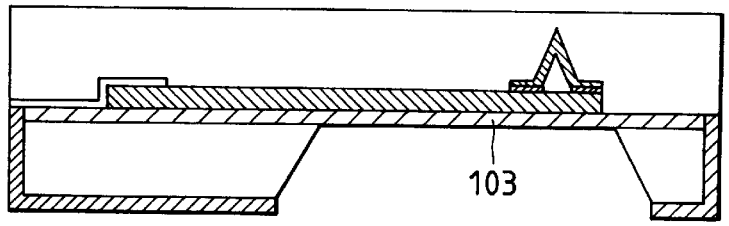

The Si exposed surface on the back side of the Si substrate 101 is subjected to crystallographic axis anisotropic etching by using an aqueous potassium hydroxide solution subjected to heating (FIG. 4E).

Figure 4F:
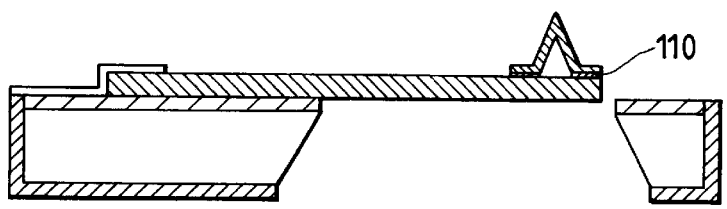

After the anisotropic etching, the exposed $SiO_2$ layer 103 is dissolved away by a BHF solution and subsequently the protective film 109 is removed by an oxygen plasma treatment, thereby obtaining a desired probe 110 (FIG. 4F).

Figure 1A:
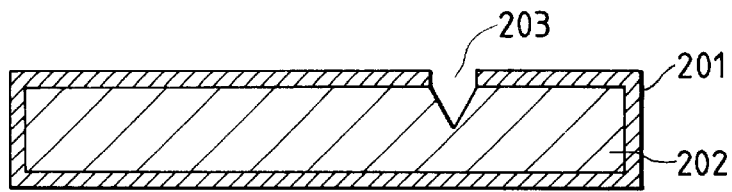
FIGS. 1A to 1G are sectional views showing conventional probe manufacturing steps.
Figure 1B:
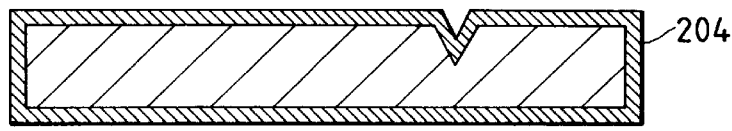
Figure 1C:
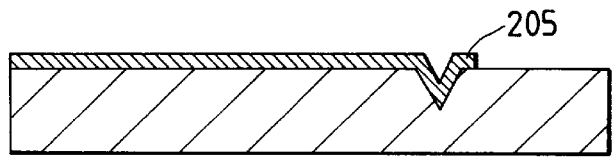
Figure 1D:
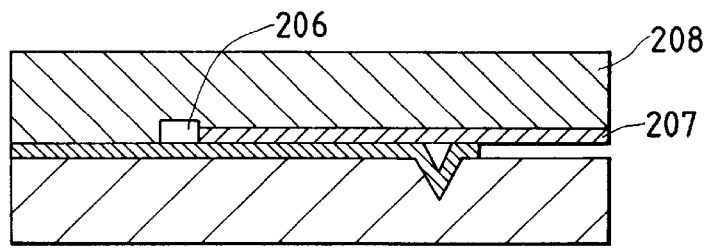
Figure 1E:
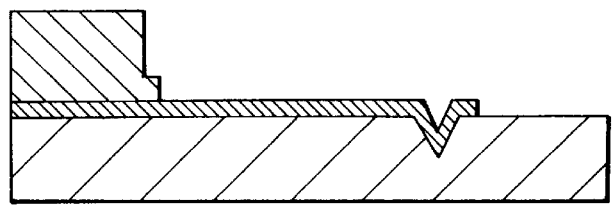
Figure 1F:
Figure 1G:
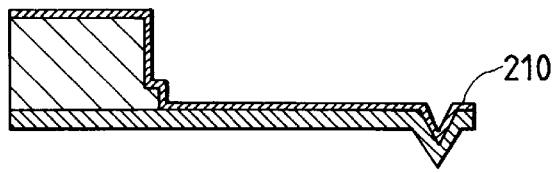
Figure 2A:
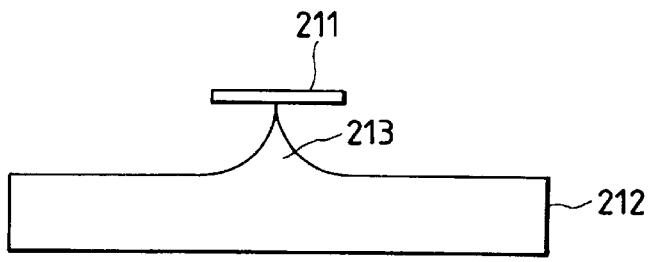
FIGS. 2A and 2B are sectional views showing conventional tip manufacturing methods.
Figure 2B:
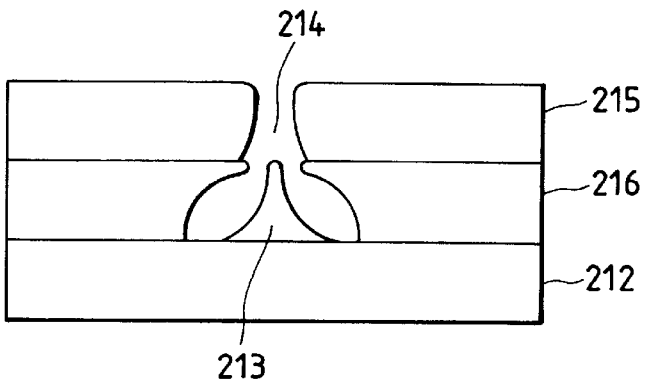

The tip thus formed has a hollow region and hence is lighter than that of a tip shown in FIG. 2B.

Also, the tip can be adhered to any place on the cantilever and this increases the allowance of the manufacturing process.

Practical examples of the present invention will be described below.

EXAMPLE 1

A 0.2-μm thick silicon nitride (SiN) layer 108 was formed by LP-CVD (Low Pressure Chemical Vapor Deposition) on an SOI (Silicon On Insulator) substrate manufactured by forming a 0.5-μm thick $SiO_2$ layer 103 and a 1.0-μm thick single-crystal Si layer 107 on a (100) Si substrate 101 (FIG. 4A).

The single-crystal Si layer 107 used had a resistivity of 0.01 Ω·cm or less.

A resist pattern was formed on the back side to etch the Si substrate 101, and the SiN layer 108 was patterned by dry etching using $CF_4$ gas.

The SiN layer 108 on the entire upper surface was etched away, and the single-crystal Si layer 107 was patterned into the shape of a cantilever 102 by photolithography and etching (FIG. 4B).

The cantilever shape was a rectangle 250 μm long and 40 μm wide. An electrode line 106 for extracting a tunnel current was then formed on an end portion of the cantilever 102 (FIG. 4C).

Subsequently, a tip was formed on another substrate.

A 0.1-μm thick $SiO_2$ layer 112 was formed on a (100) Si substrate 111. A hole with a diameter of 6 μm was formed in this $SiO_2$ layer 112 by photolithography and etching.

The resultant substrate was subjected to crystallographic axis anisotropic etching by using an aqueous potassium hydroxide solution, forming an inverse triangular recessed portion 113 in the hole (FIG. 5A).

The substrate was dipped into a BHF solution to dissolve away the $SiO_2$ layer 112 (FIG. 5B). The resultant substrate was then heated in an oxidizing atmosphere to form a 100-μm thick $SiO_2$ layer 114 on all the surfaces of the substrate (FIG. 5C).

Subsequently, a 1μm thick Au film 115 as a tip material was formed on the substrate (FIG. 5D) and patterned by photolithography and etching, thereby forming a tip 105 (FIG. 5E).

A natural oxide film on the surface of the cantilever 102 was removed by dipping the cantilever 102 into a BHF solution.

Subsequently, the substrate on which the cantilever 102 was formed and the substrate on which the tip 105 was formed were positioned. When the distal end portion of the cantilever 102 and the tip 105 were opposed to each other, the two substrates are brought into contact with each other under pressure (FIG. 6A).

Thereafter, the two substrates were peeled and it was found that the tip 105 was well formed on the cantilever 102 (FIG. 6B).

When the interface between the cantilever 102 and the tip 105 was later observed with a transmission electron microscope (TEM), an Au silicide layer was observed.

Subsequently, a 5-μm thick polyimide layer 109 was formed as a protective film on the surface of the substrate where the cantilever 102 and the tip 105 were formed (FIG. 4D).

The lower surface of the substrate was dipped into an aqueous potassium hydroxide solution to perform crystallographic axis anisotropic etching (FIG. 4E).

After the etching, the exposed $SiO_2$ layer 103 was dissolved away with a BHF solution.

Furthermore, an oxygen plasma treatment was performed to remove the polyimide layer 109, obtaining a probe 110 of the present invention (FIG. 4F).

7

In this example, nine probes were simultaneously formed on the same substrate by the above formation method. When these probes were measured with a scanning laser microscope (manufactured by Laser Tech), no warp was detected in both the longitudinal and lateral directions of the cantilever of any probe.

This is so because the cantilever itself was made from the single crystal and the substrate holding the cantilever was also made from the same single-crystal Si. Accordingly, this demonstrates that no excess stress leading to break of the cantilever was acting.

By using the probe 110 of this example, the cleavage plane of an HOPG (High Orientation Pyrolytic Graphite) substrate was observed with a scan area of 1000 Å×1000 Å by an AFM/STM apparatus. Consequently, good surface information could by obtained with a high reproducibility.

EXAMPLE 2

As in Example 1, a 0.2-$\mu$m thick SiN layer 108 was formed on an SOI substrate (FIG. 4A).

A single-crystal Si layer 107 having a resistivity of 0.01 $\Omega$·cm or less was used.

The SiN layer 108 on the back side was patterned and the SiN layer 108 on the entire upper surface was removed by etching. Thereafter, the single-crystal Si layer 107 was patterned into the shape of a cantilever 102 by photolithography and etching (FIG. 4B).

The lever shape was a rectangle 200 $\mu$m long and 50 $\mu$m wide.

Subsequently, an electrode line 106 for extracting a tunnel current was formed on an end portion of the cantilever 102 fixed on the SiO$_2$ layer (FIG. 4C).

A tip 105 was formed following the same procedure as in Example 1.

Pt was used as the tip material.

A natural oxide film on the surface of the cantilever 102 was removed by dipping the cantilever 102 into a BHF solution.

The substrate on which the cantilever 102 was formed and the substrate on which the tip 105 was formed were positioned, and the two substrates were joined under pressure (FIG. 6A).

While these substrates were joined, the substrates were heated to 150° C. When the two substrates were peeled after being joined, it was found that the tip 105 was well formed on the cantilever 102 (FIG. 6B).

When the interface between the cantilever 102 and the tip 105 was later observed with a transmission electron microscope (TEM), a Pt silicide layer was observed.

Subsequently, a 5-$\mu$m thick polyimide layer 109 was formed as a protective film on the surface of the substrate where the cantilever 102 and the tip 105 were formed (FIG. 4D).

The lower surface of the substrate was dipped into an aqueous potassium hydroxide solution to perform crystallographic axis anisotropic etching (FIG. 4E).

After the etching, the exposed SiO$_2$ layer 103 was dissolved away with a BHF solution.

Furthermore, an oxygen plasma treatment was performed to remove the polyimide layer 109, obtaining probe 110 of the present invention (FIG. 4F).

In this example, sixteen probes were simultaneously formed on the same substrate by the above formation method. When these probes were measured with a scanning laser microscope, no warp was detected in both the longitudinal and lateral directions of the cantilever of any probe.

By using the probe 110 of this example, the cleavage plane of an HOPG (High Orientation Pyrolytic Graphite) substrate was observed with a scan area of 1000 Å×1000 Å by an AFM/STM apparatus. Consequently, good surface information could by obtained with a high reproducibility.

EXAMPLE 3

As in Example 1, a 0.2-$\mu$m thick SiN layer 108 was formed on an SOI substrate (FIG. 4A).

A single-crystal Si layer 107 having a resistivity of 0.01 $\Omega$·cm or less was used.

The SiN layer 108 on the back side was patterned and the SiN layer 108 on the entire upper surface was removed by etching. Thereafter, the single-crystal Si layer 107 was patterned into the shape of a cantilever 102 by photolithography and etching (FIG. 4B).

The cantilever shape was a rectangle 200 $\mu$m long and 50 $\mu$m wide. Subsequently, an electrode line 106 for extracting a tunnel current was formed on an end portion of the cantilever 102 (FIG. 4C).

A tip 105 was formed following the same procedure as in Example 1.

Ir was used as the tip material.

A natural oxide film on the surface of the cantilever 102 was removed by dipping the cantilever 102 into a BHF solution.

The substrate on which the cantilever 102 was formed and the substrate on which the tip 105 was formed were positioned, and the two substrates were joined under pressure (FIG. 6A).

While these substrates were joined, the substrates were heated to 120° C. When the two substrates were peeled after being joined, it was found that the tip 105 was well formed on the cantilever 102 (FIG. 6B).

When the interface between the cantilever 102 and the tip 105 was later observed with a transmission electron microscope (TEM), an Ir silicide layer was observed.

Subsequently, a 5-$\mu$m thick polyimide layer 109 was formed as a protective film on the surface of the substrate where the cantilever 102 and the tip 105 were formed (FIG. 4D).

The lower surface of the substrate was dipped into an aqueous potassium hydroxide solution to perform crystallographic axis anisotropic etching (FIG. 4E).

After the etching, the exposed SiO$_2$ layer 103 was dissolved away with a BHF solution.

Furthermore, an oxygen plasma treatment was performed to remove the polyimide layer 109, obtaining a probe 110 of the present invention (FIG. 4F).

In this example, sixteen probes were simultaneously formed on the same substrate by the above formation method. When these probes were measured with a scanning laser microscope, no warp was detected in both the longitudinal and lateral directions of the cantilever of any probe.

By using the probe 110 of this example, the cleavage plane of an HOPG (High Orientation Pyrolytic Graphite) substrate was observed with a scan area of 1000 Å×1000 Å by an AFM/STM apparatus. Consequently, good surface information could by obtained with a high reproducibility.

EXAMPLE 4

Figure 7:
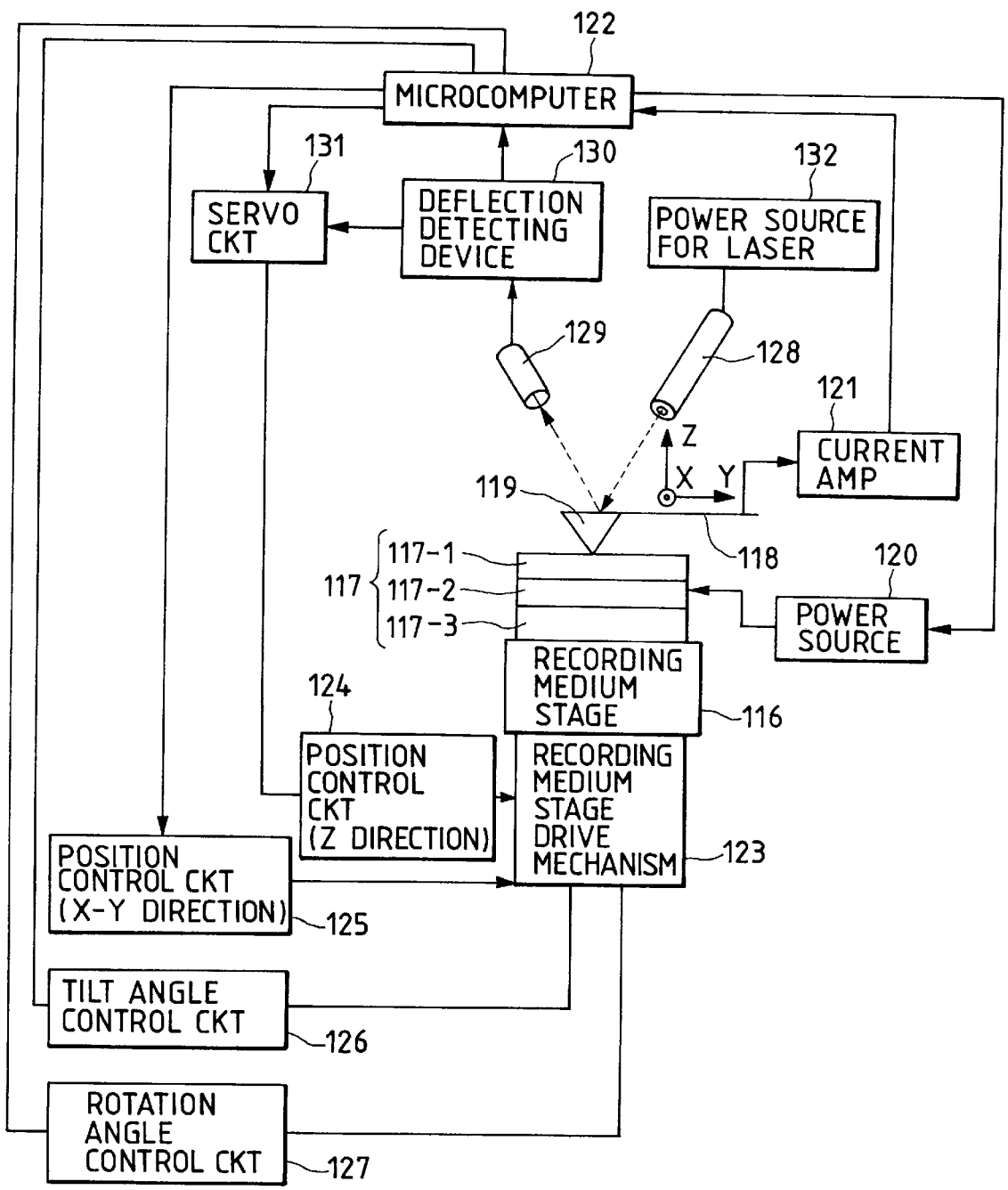
FIG. 7 is a block diagram showing the schematic arrangement of an information recording/reproducing apparatus of the present invention.

An information recording/reproducing apparatus using a probe manufactured following the same procedure as in Example 1 will be described below. FIG. 7 shows the arrangement of major components and a block diagram of the present invention. This example will be described with reference to FIG. 7. A probe 118 was arranged to oppose a recording medium 117 on a recording medium stage 116.

This recording medium 117 consists of an information recording layer 117-1, an underlying electrode 117-2 for applying a voltage to the information recording layer 117-1, and a substrate 117-3.

The information recording layer 117-1 is, e.g., a thin organic film which changes its electrical properties (an electrical memory effect) due to a tunnel current produced between the layer 117-1 and a tip 119.

The apparatus also includes a power source 120 and a current amplifier 121 which is connected to a microcomputer 122 and used to record and reproduce information with respect to the recording medium 117.

The recording medium stage 116 on a recording medium stage drive mechanism 123 is controlled by a position control circuit (Z direction) 124, a position control circuit (X-Y direction) 125, a tilt angle control circuit 126, and a rotation angle control circuit 127 under the control of the microcomputer 122. A laser 128 is irradiated on the point of the probe 118, the reflected light is received by a split sensor 129, and the deflection of the probe 118 is detected by a deflection detecting device 130.

This information is supplied to the microcomputer 122 and a servo circuit 131.

The recording medium 117 of this example was manufactured by depositing a 30-nm thick Au film as the underlaying electrode 117-2 on the silica glass substrate 117-3 by vacuum deposition and forming a polyimide layer (the information recording layer 117-1) on top of the underlying electrode 117-2 by an LB (Langmuir-Blodgett) technique.

The probes 118 manufactured in the first example were incorporated into the recording/reproducing apparatus described above, and recording and reproduction were performed by a principle and a method disclosed in Japanese Laid-Open Patent Application No. 63-161552. Consequently, good AFM images could be obtained with all of the probes 118, and damages, e.g., film peeling, to the recording medium 117 were not observed.

Subsequently, while the recording medium 117 was scanned by using the recording medium stage 116, a pulse voltage was applied between the tip 119 and the underlying electrode 117-2. The application of the voltage was done by using a 3-V pulse rectangular wave with a width of 50 ns. After the pulse application, the recording medium was scanned with a DC voltage of 200 mV. As a consequence, the characteristics changed in the pulse application point of the information recording layer 117-1 to produce a portion where the electrical resistance was low.

This portion with a low electrical resistance, i.e., a recording bit, had a diameter of about 10 nm. These recording and reproduction could be performed by all of the probes 118.

EXAMPLE 5

Following the same procedure as in Example 1, a torsion lever 133 was formed on an SOI substrate.

Figure 8A:
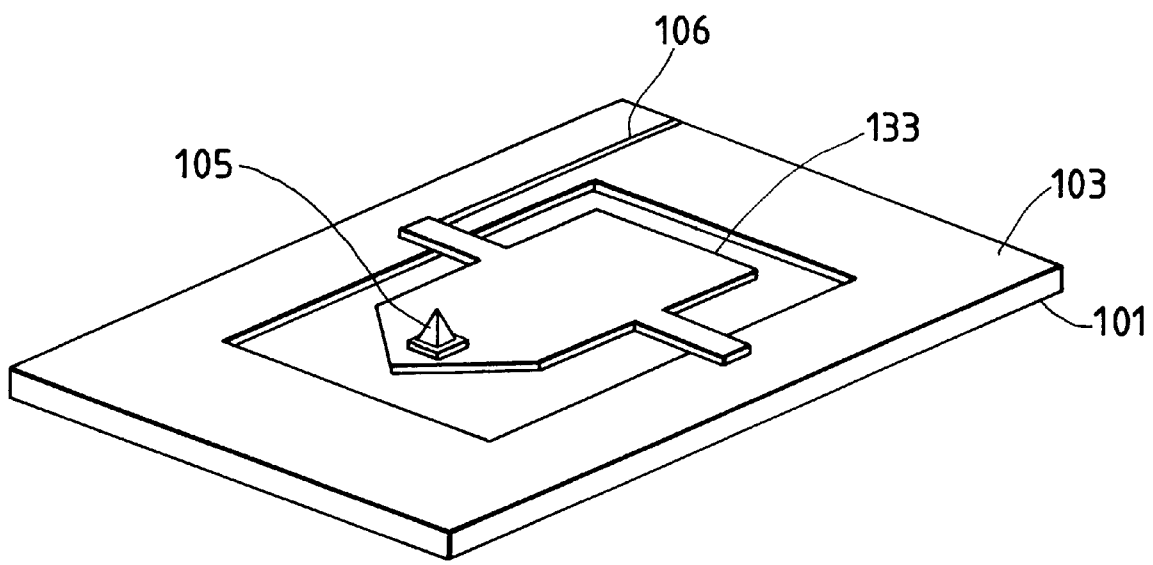
FIGS. 8A and 8B are perspective views showing the schematic structure of a probe unit of the present invention.

FIG. 8A is a perspective view of the structure.

The lever dimensions were a length of 300 μm and a width of 150 μm.

Figure 8B:
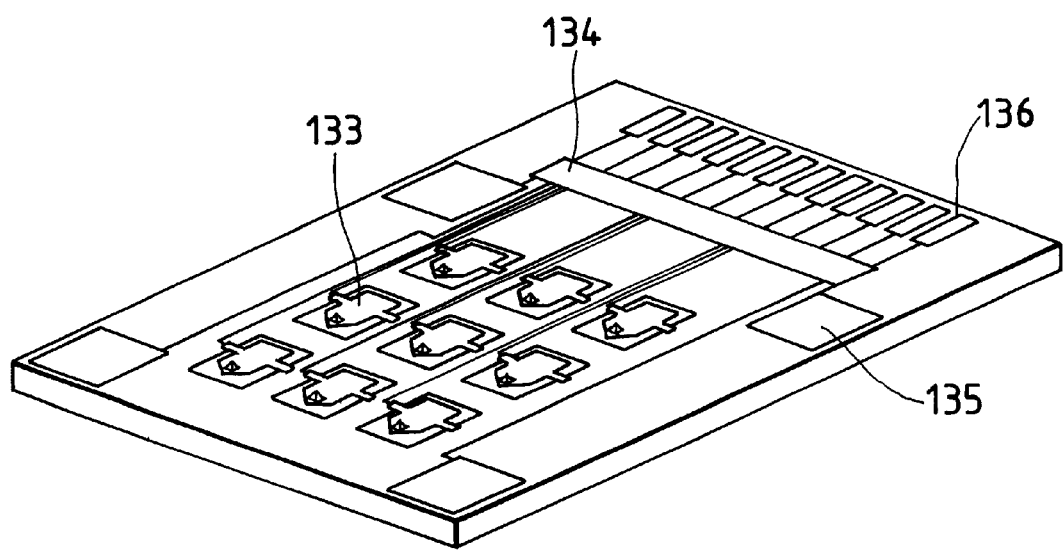

On the same substrate, a signal processing IC 134, a surface aligning mechanism 135, and signal extracting pads 136 were formed (FIG. 8B).

An IC formed on an SOI substrate has a low leakage current and hence does not easily cause a processing error when compared to an IC formed on a common Si wafer. This probe unit was used to perform recording and reproduction in the same manner as in Example 4, and it was found that the recording and reproduction could be well performed with all the probes.

In the probe of the present invention, a cantilever itself has almost no warp because the cantilever is made from single-crystal Si. Also, since the cantilever is conductive, no new electrode line needs to be formed and this prevents a warp of the lever resulting from an electrode line.

In the present invention, the cantilever itself is conductive and an electrode line is formed from an end portion of the lever. Consequently, it is possible to decrease the electrode area, reduce the stray capacitance produced between the cantilever and a recording medium, and thereby improve the recording speed.

In addition, since both the cantilever and the substrate holding the cantilever are made from single-crystal Si, no stress acts on the cantilever from the substrate. This prevents the cantilever from being broken by a stress.

The probe manufacturing method of the present invention can form a conductive metal tip having a sharp point on the cantilever with a high reproducibility.

Also, in the present invention, it is possible to reduce the weight of the end portion of the cantilever by forming a hollow structure inside the tip.

Furthermore, in the probe manufacturing method of the present invention, a tip can be directly joined to a cantilever made from single-crystal Si. Accordingly, the conductive metal tip can be readily formed in a desired position of the cantilever.

What is claimed is:

1. A probe having a metal tip on a cantilever, comprising:
   a diffused layer which is formed at an interface between said tip and said cantilever and in which a material forming said cantilever and a material forming said tip are diffused.

2. A probe according to claim 1, wherein said cantilever is made from single-crystal Si.

3. A probe according to claim 2, wherein said tip is made from a material selected from the group consisting of Au, Pt, and Ir and an alloy thereof.

4. A probe according to claim 3, wherein said diffused layer is made from a metal silicide.

5. A method of manufacturing a probe having a metal tip on a cantilever, comprising the steps of:
   forming a cantilever on a first substrate;
   forming a tip on a second substrate; and
   joining the tip to the cantilever by forming a diffused layer, in which a material forming the cantilever and a material forming the tip are diffused, at an interface between the tip and the cantilever.

6. A method according to claim 5, wherein the diffused layer is made from a metal silicide.

7. A probe unit including a probe having a metal tip on a cantilever, comprising:
   a substrate on which a signal processing IC is formed;
   a cantilever supported by said substrate;
   a tip joined on said cantilever; and
   a diffused layer which is formed at an interface between said tip and said cantilever and in which a material forming said cantilever and a material forming said tip are diffused.

8. A probe unit according to claim 7, wherein said substrate is a single-crystal Si substrate.

9. An information recording/reproducing apparatus for performing recording and reproduction of information on a recording medium by using a probe having a metal tip on a cantilever, comprising:

a probe unit comprising
a substrate on which a signal processing IC is formed,
a cantilever supported by said substrate,
a tip joined on said cantilever, and
a diffused layer which is formed at an interface between said tip and said cantilever and in which a material forming said cantilever and a material forming said tip are diffused; and means for applying a voltage between said tip and said recording medium.

* * * * *